Sept. 28, 1965 H. NEUMANN 3,209,078

MAGNETIC HEAD EQUIPPED WITH A HALL GENERATOR

Filed Dec. 20, 1960

United States Patent Office 3,209,078

Patented Sept. 28, 1965

3,209,078
MAGNETIC HEAD EQUIPPED WITH A HALL GENERATOR

Helmut Neumann, Karlsruhe, Germany, assignor to Siemens & Halske Aktiengesellschaft Berlin and Munich, a German corporation Filed Dec. 20, 1960, Ser. No. 77,168
10 Claims. (Cl. 179—100.2)

This invention is concerned with a magnetic head equipped with a Hall generator which is disposed between two ferrite members.

In previously known magnetic heads of this kind, the ferrite members including the Hall generator also form the pole pieces which are engaged by the recording member such as a tape. Ferrites which are adapted for such purpose have a coarse grained structure which is in the machining thereof easily fractured at the edges, and it is accordingly very difficult to provide defined working gaps with limit values on the order of 10 microns.

In order to overcome the resulting disadvantages, the invention proposes to form the magnetic gap, which is engaged by the recording carrier, at the juncture of two halves of a bifurcated bracket, the legs of such bracket embracing the ferrite members containing the Hall generator.

In accordance with another feature of the invention, the parts are so arranged that the ferrite members which contain the Hall generator are easily separable from the bifurcated bracket. Replacement of a worn bracket is thus easily effected.

In accordance with a further feature of the invention, the ferrite members containing the Hall generator are preferably provided with a winding comprising two parts.

In an embodiment of the invention, the bifurcated bracket is preferably made of strips of highly permeable iron sheet the rolling direction of which extends in parallel with the motion of the magnetic record carrier.

In accordance with still another feature of the invention, there is provided a housing or casing for enclosing the operatively effective parts of the magnetic head, and the bifurcated bracket is firmly connected with the housing or the cover therefor, while the Hall generator is exchangeable. This structure has the advantage of eliminating adjustment of the magnetic head after exchange of the bracket, requiring merely precaution in the fabrication so as to place fastening means of the magnetic head casing or housing and of the gap forming parts in an accurately defined position each with respect to the other. The casing can be exchanged upon wear of the gap portions of the bracket, and the Hall generator with its winding can be retained for further use.

In an embodiment of the invention which is particularly adapted for the recording and scanning of pilot signals in addition to a sound track, whereby the gap of the pilot head is displaced by 90° with respect to the sound head, the metal strips of the bifurcated bracket are on both sides of the gap bent in the direction of the record carrier and embraced by non-magnetic material at least at the broad sides, such material forming backing surfaces for the record carrier. The recorded signal is thereby limited to a very narrow track.

Another embodiment employs a bifurcated bracket made of laminated metal strips.

In case occasional adjustment of the magnetic head should be required for some reason, the magnetic head may be constructed so that merely the bifurcated bracket need be removed from the casing after wear of the gap forming parts thereof. A particularly simple structure of the head is obtained by fastening the halves of the bracket each in one-half of a casing or housing, which can be separated along the gap plane, and clamping the Hall generator between the bracket parts incident to assembly of the casing parts.

The foregoing and other objects and features of the invention will appear from the description of embodiments which is presented below with reference to the accompanying drawing.

Some of the parts of the magnetic heads shown in the figures are mutually exchangeable.

Figure 1:
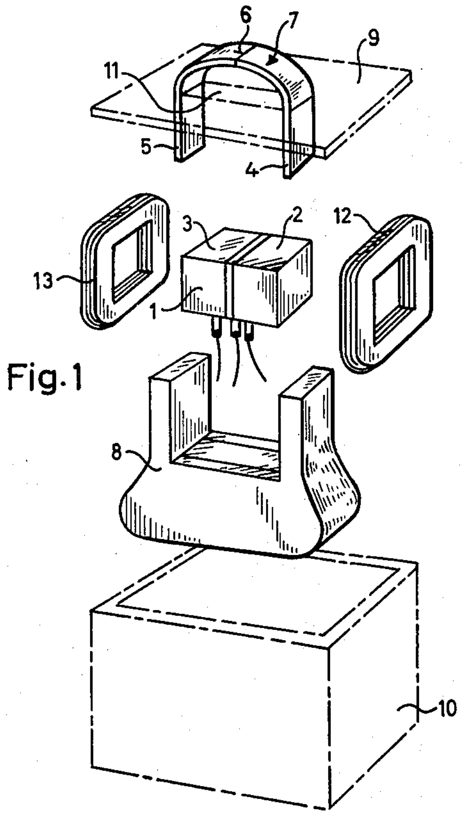
FIG. 1 shows a first embodiment in exploded view.

In FIG. 1, the Hall generator 1 is made in the form of a thin plate or a vaporized layer disposed between the ferrite members 2 and 3. The latter are suitably cemented together, for example, by means of moldable resin, and form with the Hall generator a structural unit. The bifurcated gap-forming bracket 7 is made of metallic strips 4 and 5 which are joined to form the pole pieces of the magnetic head. Particularly slight wear is obtained when the direction of rolling of the metal strips 4 and 5 extends in parallel with the motion of the record carrier or tape. The metal strips 4 and 5 are joined at the working gap 6 by means of hard solder, the soldering being suitably effected by conducting through the corresponding area an accurately dosed current. It is understood, of course, that filling material is placed in the gap, for example, a thin bronze foil, and also solder, which may likewise be in the form of a foil. The legs of the bracket 7 thus formed by the parts 4 and 5 embrace the ferrite members 2 and 3. For fastening the bracket 7 with respect to the ferrite members 2 and 3, there may be used a clamp shaped part 8, made of non-magnetic material; another mode of fastening may be utilized, for example, screws or suitable cementing.

The legs 4 and 5 of the bifurcated bracket 7 can be firmly connected with the casing or housing 10. In the illustrated example, they are connected with the cover plate 9, indicated in dot-dash lines, which is suitably made of synthetic material, and held thereon in a defined position by cementing, the cement joint being indicated by numeral 11.

Windings 12 and 13 may be placed upon the respective ferrite members 2 and 3 so as to adapt the magnetic head for recording.

Figure 2:
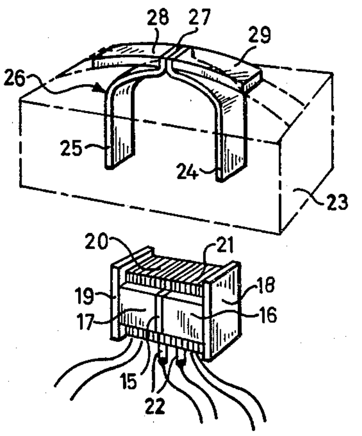
FIG. 2 represents another embodiment including a modified manner of constructing the ferrite members.

In the example represented in FIG. 2, the ferrite members 16 and 17 which include the Hall generator 15, are provided with flanges respectively shown at 18 and 19. The coil windings are shown partly cut away and marked by numerals 20 and 21. Between the coil windings 20, 21 are provided soldering tabs 22 with terminal means for the Hall generator 15. The Hall generator forms with the ferrite members and the recording windings a structural unit which is inserted from below into the housing 23 between the legs 24, 25 of the bifurcated bracket 26. The surfaces of the ferrite members 18, 19 which are brought into engagement with the legs 24, 25 of the bracket, are suitably ground so as to reduce the magnetic impedance at the engaging areas. A clamping member such as, for example, the clamping member 8 of FIG. 1, may be used for effecting the connection. It is, however, also possible to utilize cementing for this purpose. Thermoplastic material used as a cementing substance will make it possible to effect upon heating thereof, removal of the structural unit containing the Hall generator, should removal thereof be required.

The inner ends of the bracket 26 shown in FIG. 2 are bent at the gap 26 in the direction toward the record carrier. The advantage of this feature is that only slight scattering of the magnetic field will occur incident to recording. This embodiment is particularly adapted for pilot recording according to a known method, whereby the pilot head, which is with respect to one sound track displaced by 90° relative to the sound head, records an auxiliary 25 cycle or 50 cycle signal for the synchronization with a picture recording. The bracket halves which delimit the gap 27 are disposed between arcuate members 28 and 29 which are made of non-magnetic material and form a surface for backing the moving record carrier, tape or the like. These members 28, 29 may be made, for example, of a brass alloy which has abrasion properties similar to those of the material, for example, mu-metal employed for making the bracket parts 24, 25. So far as the principle is concerned, the bracket may in all embodiments be made of a magnetic hard metal, for example, of the material known by the name of Vacolur. However, a correspondingly hard material must in such case be used for the tape backing members 28, 29 and also for the gap filling material.

Figure 3:
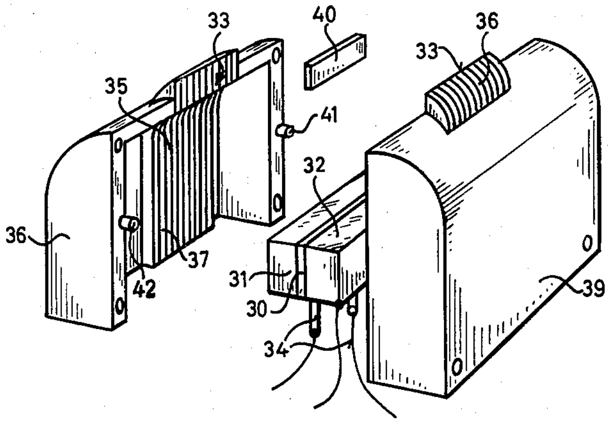
FIG. 3 illustrates still another embodiment.

In the embodiment shown in FIG. 3, numeral 30 indicates the Hall generator which is disposed between two ferrite strips 31, 32, the terminals of the Hall generator being indicated by numeral 34. The two halves 35, 36 of the bifurcated gap-forming bracket are made of laminated sheet material. The resulting laminated members are ground plane at the gap surfaces 33 and along the surfaces 37 which engage the ferrite members 31 and 32. The two parts 35, 36 of the bracket, the laminae of which are suitably cemented together, are placed with accurate fit into corresponding recesses formed in the respective housing parts 38, 39 and fastened therein by cementing or molding with resin or the like. The housing parts 38, 39 may be made of brass or suitable synthetic material.

The parts shown in FIG. 3 are assembled to form the corresponding magnetic head by joining the housing halves 38, 39, which contain the bracket parts 35, 36, by means of screws, thereby clamping the gap foil 40 in place between the gap surfaces 33 while clamping in place the ferrite members 31, 32 with the Hall generator 30, between the surfaces 37 formed by the legs of the gap defining bracket. The housing parts 38, 39 are constructed so as to obtain upon screw joining thereof a spring action which is effective to press together the operatively effective parts of the magnetic head. The accurate placement of the parts is facilitated by locating pins such as 41, 42, on the housing part 38 which enter into holes formed in the housing part 39. The assembled device may be placed in customary manner into a special shielding casing. The Hall generator 30 with its ferrite members 31, 32 can be readily downwardly removed upon loosening the screw connections. A recording winding or windings may be provided in the manner described in connection with FIGS. 1 and 2.

The invention is also suitable for making multi-track heads.

Changes may be made within the scope and spirit of the appended claims which define what is believed to be new and desired to have protected by Letters Patent.

I claim:

1. A magnetic head for cooperation with a movable magnetic record carrier, comprising a Hall generator disposed between proximate surfaces of two ferrite members of block form, a generally U-shaped pole structure made of two iron strips of high permeability joined together and forming at the corresponding joint a magnetic gap which is engaged by the record carrier, the direction of motion of said record carrier coinciding with the direction of rolling of said strips during their fabrication, the legs of said pole structure operably straddling the ferrite members and contacting in low reluctance relationship distal surfaces of said members remote from said Hall generator.

2. A magnetic head according to claim 1, comprising coil windings carried by said ferrite members.

3. A magnetic head according to claim 1, wherein said ferrite members containing said Hall generator are removably disposed entirely between the legs of said pole structure.

4. A magnetic head according to claim 1, comprising coil windings carried by said ferrite members, said ferrite members containing said Hall generator and provided with said coil windings being removably disposed between the legs of said pole structure.

5. A magnetic head according to claim 1, wherein said parts of which said pole structure is made are joined by soldering.

6. A magnetic head according to claim 1, wherein portions of said iron strips extend on both sides of the gap angularly in the direction of the record carrier, and members made of non-magnetic material extending from said portions and forming arcuately directed surfaces for backing the record carrier.

7. A magnetic head according to claim 1, wherein said pole structure is made of laminated sheet material.

8. A magnetic head according to claim 1, comprising a housing for removably receiving said Hall generator and parts cooperating therewith, and means for fixedly connecting said pole structure with part of said housing.

9. A magnetic head according to claim 1, wherein said pole structure is removably arranged with respect to said Hall generator and parts cooperating therewith.

10. A magnetic head according to claim 1, comprising a housing made of two separable parts with each housing part containing one part of said pole structure, said housing parts being upon joining thereof operative to clamp in position therebetween the Hall generator and part cooperating therewith and being further operative to effect joining of the parts of said pole structure to form said magnetic gap.

References Cited by the Examiner

UNITED STATES PATENTS

| | | | |
|---|---|---|---|
| 2,683,774 | 7/54 | Camras | 340—174.1 |
| 2,861,135 | 11/58 | Rettinger | 179—100.2 |
| 2,866,011 | 12/58 | Kornei | 179—100.2 |
| 2,907,834 | 10/59 | Duinker | 179—100.2 |
| 2,978,545 | 4/61 | Howling | 179—100.2 |
| 3,041,414 | 6/62 | Gratian | 179—100.2 |

FOREIGN PATENTS 846,260 8/60 Great Britain.

IRVING L. SRAGOW, *Primary Examiner.*

NEWTON N. LOVEWELL, BERNARD KONICK, *Examiners.*